United States Patent [19]

Meginnis et al.

[11] 4,042,162
[45] Aug. 16, 1977

[54] AIRFOIL FABRICATION

[75] Inventors: George B. Meginnis; Earl W. Sodeberg, both of Indianapolis, Ind.

[73] Assignee: General Motors Corporation, Detroit, Mich.

[21] Appl. No.: 595,025

[22] Filed: July 11, 1975

[51] Int. Cl.² .......................................... B23K 19/00
[52] U.S. Cl. ............................... 228/106; 228/127; 228/193; 228/212; 228/243; 29/156.8 H
[58] Field of Search ................. 29/156.8 R, 156.8 B, 29/156.8 H, 156.8 P, 447, 448; 228/193, 194, 195, 106, 127, 173, 243, 212, 213

[56] References Cited

U.S. PATENT DOCUMENTS

| 2,787,049 | 4/1957 | Stalker | 416/97 A |
| 2,946,681 | 7/1960 | Probst et al. | 416/97 R |
| 3,172,621 | 3/1965 | Erwin | 416/97 A |
| 3,584,972 | 6/1971 | Bratkovich et al. | 29/156.8 B X |
| 3,701,190 | 10/1972 | Stone | 29/156.8 B |
| 3,762,032 | 10/1973 | Bowling et al. | 228/127 |

FOREIGN PATENT DOCUMENTS 147,690  8/1952  Australia ................. 416/97

Primary Examiner—Al Lawrence Smith
Assistant Examiner—K. J. Ramsey
Attorney, Agent, or Firm—J. C. Evans

[57] ABSTRACT

A method of bonding a laminated porous sheath to a cast strut includes the step of performing a compressible pad to have a plurality of closely spaced grooves on one surface thereon and a plurality of spaced apart lands on the opposite face thereof; locating a preformed porous laminate sheath over the outer surface of a cast strut and laser welding it thereto and thereafter assembling the preformed compressible pad to locate the plurality of grooves thereon in overlying relationship to a plurality of airflow openings in the porous laminated sheath and with ribs on either side of the grooves being located in juxtaposed relationship with the outer surface of the porous laminated sheath for uniformly distributing a load thereto; locating the preassembled casting, sheath and compressible pad within a contoured opening formed by a three piece pressure block fixture and applying a predetermined pressure to the assembled parts while subjecting them to a predetermined bond temperature while applying a vacuum.

3 Claims, 8 Drawing Figures

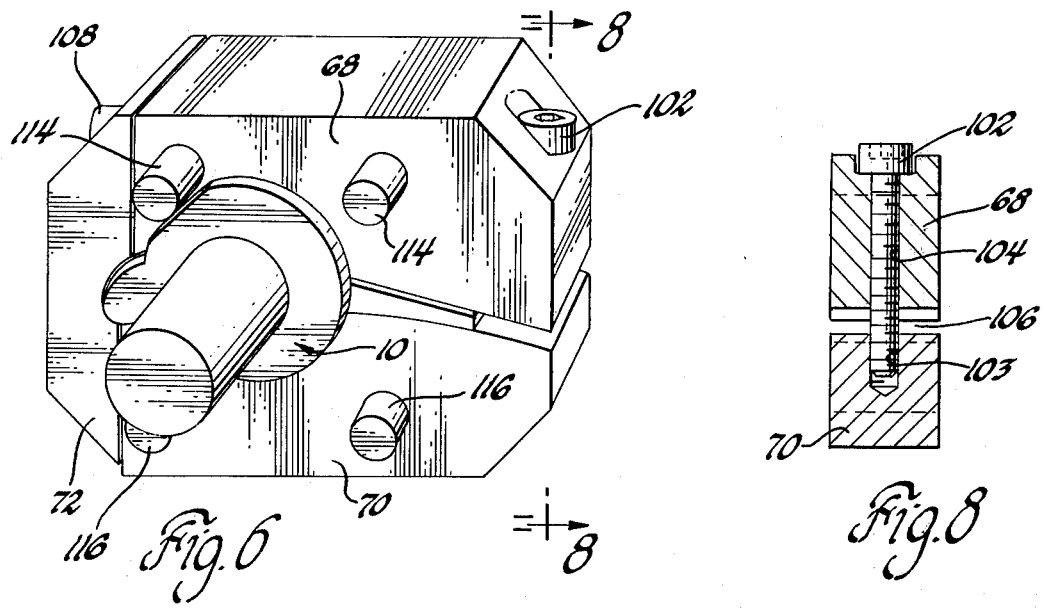
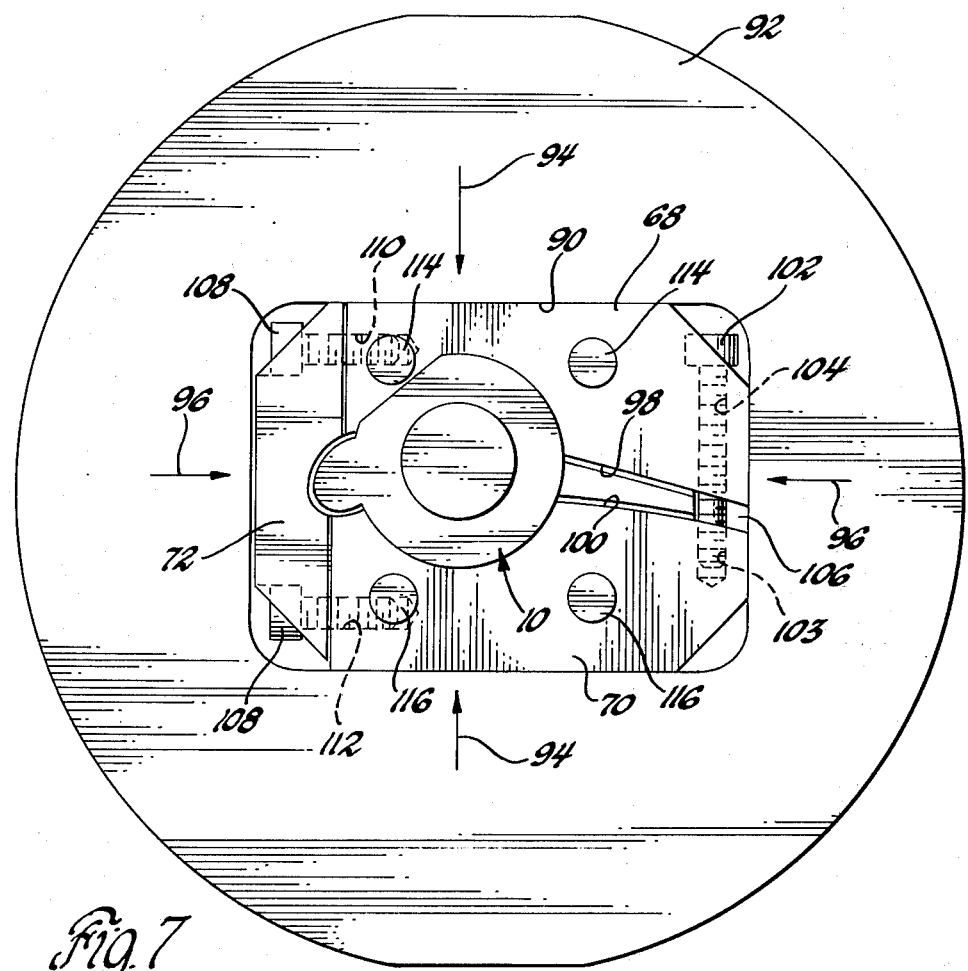

AIRFOIL FABRICATION

This invention relates to struts having an internal casting and an outer preformed, porous laminated sheath for directing cooling air from the interior of the strut to the outer surface of the preformed laminate sheath and more particularly to an improved method for manufacturing such a structure to produce a bonded connection between an interface between the inner surface of the preformed laminated sheath and the outer surface configuration of the casting.

Many high performance struts, such as air cooled turbine blades and airfoils, have a hollow cast airfoil member with holes through its walls joined to a preformed porous laminate sheath by means of a diffusion bond process. In such a process the parts are located within a pair of contoured pressure blocks and subjected to a load during a bond cycle wherein the pressure blocks and contained assembly are subjected to a furnace temperature in the order of 2000° F for a substantial time period in the order of 4 hours.

It has been proposed to incorporate scab plates within such load bearing blocks to uniformly distribute the load applied to the blocks to the interface between the preformed porous laminate material and the internal casting of the assembly.

One problem with prior processes has been that of configuring and locating a scab sheet to produce a uniform distribution of load to the preformed laminate sheath so as to avoid deformation thereof relative to the outer surface configuration of the casting. Another problem is that of providing suitable relief between the scab sheet and the preformed laminate sheath so as to assure a free flow of gas from within the assembled casting and sheath during the vacuum bond process.

Accordingly, an object of the present invention is to provide an improved method for connecting a preformed porous laminate material having a plurality of pin point openings to the outer surface of a precast strut having side wall openings therein for directing air flow through the pin point openings in the sheath for flow across the outer surface of the sheath wherein the process includes the steps of; forming a compressible pressure pad from a material of yield strength less than that of the preformed porous laminate sheath wherein one surface of the pad is configured to have a plurality of grooves formed transversely thereacross between the opposite ends of the pads, each of the grooves being formed by separating ribs; the opposite surface of the pad being formed to have a plurality of spaced land surfaces thereon and a plurality of reinforced ribs thereon; the method thereafter including the substeps of wrapping the sheath on the casting; thereafter wrapping the compressible pad around the outer surface of the preformed porous laminate sheath so as to bridge adjacent ones of the pinpoint openings therein by the groove forming ribs and by locating the reinforced ribs on the outer surface of the pad at the leading edge of the porous laminated sheath; placing the assembled parts in a three piece pressure block fixture; and applying a bond load to the land surfaces on the pad to cause a deformation thereof and a resultant distribution of load to the sheath to produce a bonding pressure at interface surfaces between the sheath and the casting.

Another object of the invention is to provide an improved three piece pressure block fixture and ring for applying a uniform load to a laminated sheath for bonding it on the outer surface of a cast strut.

Another object of the present invention is to improve the bonding of a porous laminated sheath to the outer surface of a casting by the provision of an improved compressible pad to accommodate manufacturing tolerances in the workpiece and the tooling; the pad having a plurality of preformed grooves formed transversely across its inner surface in engagement with the sheath to provide channels for outgas flow from the casting and sheath and the pad further having a plurality of preformed spaced land portions on its outer surface in juxtaposed relationship with a contoured surface of a pressure fixture; the compressible pad further being configured to have a plurality of reinforced ribs on the outer surface thereof; the pad lands being upset to accommodate mismatch between the fixture and sheath and to reduce deformation of the sheath.

Further objects and advantages of the present invention will be apparent from the following description, reference being had to the accompanying drawings wherein a preferred embodiment of the present invention is clearly shown.

FIG. 6 is a perspective view of an unloaded three piece pressure block fixture;

FIG. 7 is a view of the FIG. 6 fixture loaded in a compression ring; and

FIG. 8 is a cross-sectional view taken along line 8—8 of FIG. 6.

Figure 1:
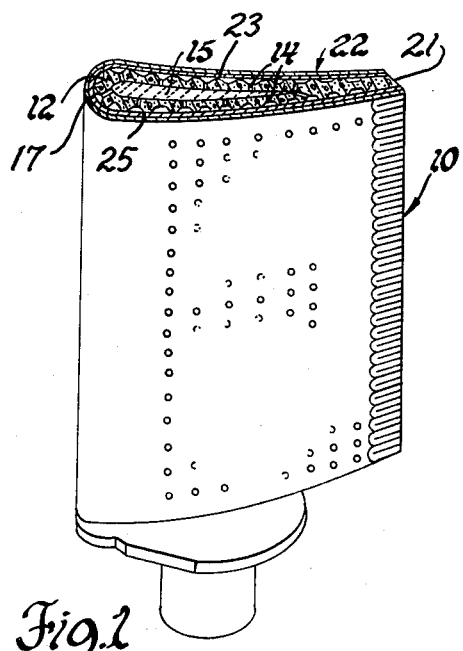
FIG. 1 is a perspective view of a composite strut in the form of a turbine blade constructed by the method of the present invention.

Referring to the drawing, in FIG. 1, a composite strut assembly 10 is illustrated in the form of a turbine blade having an internal casting 12 with a plurality of air cooling passages 14 at spaced-apart points along the wall of the casting 12. The casting 12, as shown in FIG. 1, has an airfoil shape with a leading edge 17, a trailing edge 21 and concave and convex walls 23, 25 joining the leading edge 17 to the trailing edge 21. A central casting core 15 is shown in place within the assembly 10. The wall passages 14 are in communication with a plurality of surface valleys or grooves 16 that are formed on either side of radially outwardly directed ribs or lands 18 each having an outer bond surface 19 which engages the inner surface 20 of a porous laminated sheath 22 having a plurality of pin point openings 24 therethrough to communicate each of the grooves 16 with the outer surface of the sheath 22.

The porous laminated sheath 22 is preformed from a high alloy material to provide a protective outer surface on the composite strut structure 10. Examples of a sheath suitable for the outer surface of the assembly 10 are more particularly set forth in U.S. Pat. Nos.

3,560,107 issued Feb. 2, 1971, to H. E. Helms; 3,584,972 issued June 15, 1971, to George B. Meginnis and Nick F. Bratkovich; and 3,606,573 issued Sept. 20, 1971, to C. W. Emerson et al.

In the fabrication of composite assemblies 10 of the type shown in FIG. 1, it has been common practice to maintain a predetermined loading between the interface of the ribs 18 of the internal casting 12 and the inner surface of the sheath 20 during a high temperature vacuum bonding operation. Such process requires intimate surface contact for diffusion bonding and this requires that means be incorporated in the process to compensate for misalignment of parts.

Figure 2:
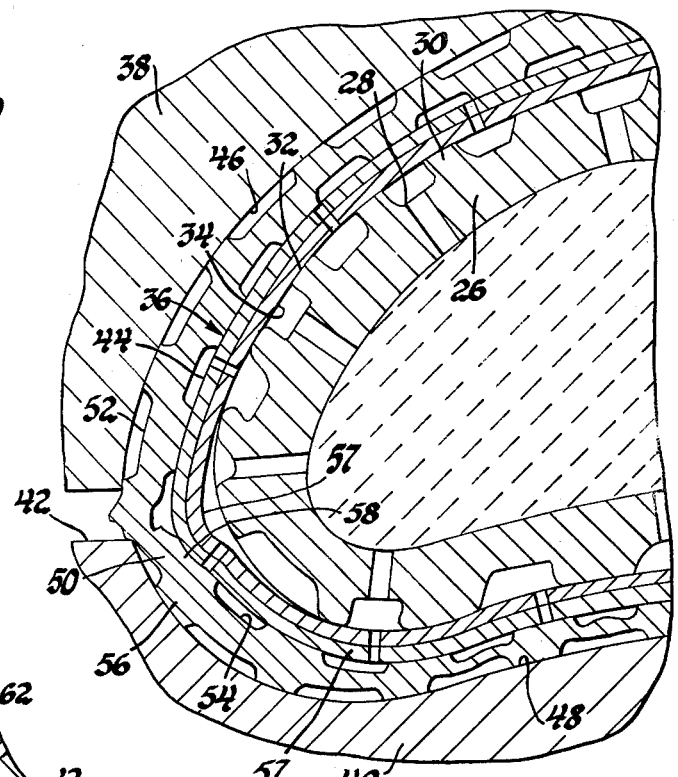
FIG. 2 is an enlarged, fragmentary, cross-sectional view of a leading edge of a compressible pad and two piece pressure block arrangement used in prior art processes to bond a porous sheath to an airfoil casting.

In past processes, as shown in FIG. 2, an internal casting 26 has outer grooves 28 thereon separated by a plurality of ribs 30 each having an outer load surface 32 thereon in engagement with an inner surface 34 of a porous, laminated outer sheath 36 like sheath 22. These parts are located between a pair of pressure blocks 38, 40 having a separation line 42 therebetween. In order to assure conformity between the outer surface 44 of the porous laminated sheath 36 and spaced-apart contoured surfaces 46, 48 on the pressure blocks 38, 40 respectively, prior methods of manufacture have included a deformable sheath or pad 50 wrapped on the outer surface of the laminate porous sheath 36 as shown in fragmentary form in FIG. 2. Typically, such pads 50 included a pair of spaced-apart surfaces 52, 54 thereon each having a plurality of upstanding segments 56, 58 thereon that were deformed be bending distortion of the segments, upon application of a load, from one surface to space between segments on an opposite face. This distortion was intended to compensate for misalignment between the contoured surfaces 46, 48. However, material having sufficient strength at high temperatures to produce a sufficiently high load transfer is not available. Moreover, the prior art produces undesirable puckering in the sheath at the leading edge near clearance 42 as shown in FIG. 2. This resulted from inherent excess lengths of the sheath 22, and pad 50, with respect to the casting 26. The absence of radial movement of pressure blocks 38, 40 toward the radius at casting 26 prevents significant closure of the resultant gap.

Figure 3:
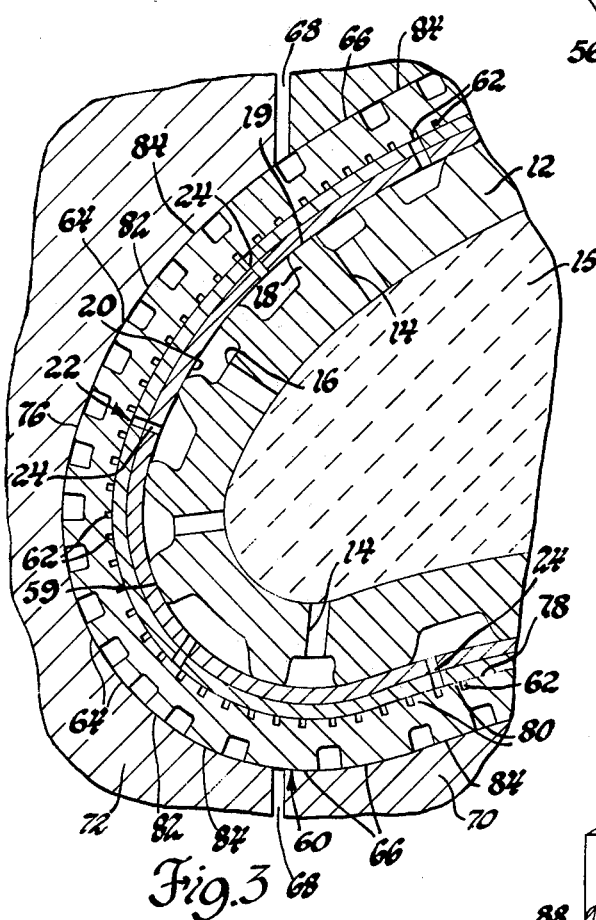
FIG. 3 is an enlarged, fragmentary, cross-sectional view of a compressible pad and an improved three piece pressure block fixture used in the present method for fabricating a sheathed cast blade assembly under vacuum and high temperature condition to produce a vacuum bond therebetween.

The subject inventive method consists of assembling the preformed porous laminated sheath 22 over a cast airfoil of the type shown at 12 at FIGS. 1 and 3.

After the preformed porous laminated sheath 22 is wrapped on the airfoil casting 12 to align the inner surface 20 thereof with the outer bond surface 19 of each of the ribs 18, the leading edge of the porous laminated sheath 22 may be tack-welded to the casting 18 at 59 by means of a laser beam.

A compressible pressure pad 60 is preformed to have a plurality of lateral outgasing grooves 62 formed on one surface thereof and to have a plurality of spaced land segments 64 on the opposite surface thereof. It is futher preformed to have a plurality of reinforced ribs 66 on the opposite surface thereof along parting lines 68. The compressible pad is wrapped on the outer surface of the preformed porous laminated sheath 22 to locate the outgasing grooves 62 in spaced parallellism with the leading edge of the outer sheath and the reinforced ribs 66 are located adjacent the leading edge of the combined casting 12 and preformed porous laminated sheath 22.

Thereafter the method contemplates placing a pair of opposed, contoured, pressure blocks 68, 70 on either side of the wrapped pressure pad 60 and a third pressure block 72 at the point of the reinforced ribs 66 on the pressure pad 60. A preload is imposed on the pressure blocks and the assembly is placed in a furnace and maintained under load and at a temperature in the order of 1975° F for a period of 4 hours to produce a diffusion bond between the inner surface 20 of the preformed porous laminated sheath 22 and the outer bond surface 19 on each of the ribs 18. The diffusion bond securely retains the wear resistant porous sheath on the outer surface of the casting throughout the airfoil outer surface configuration thereof. In practicing the present invention, the load pressure imposed by the contoured pressure blocks is in the order of 1000 p.s.i.. The preformed configuration of pad 60 and its location on the sheath 22 enables block surface misalignment to be compensated. Further, the load pressure is directed to the bond interface at 19, 20 without collapse of the air cooling interstices in the sheath 22 and notwithstanding the fact that the sheath has limited compressive strength.

Figure 4:
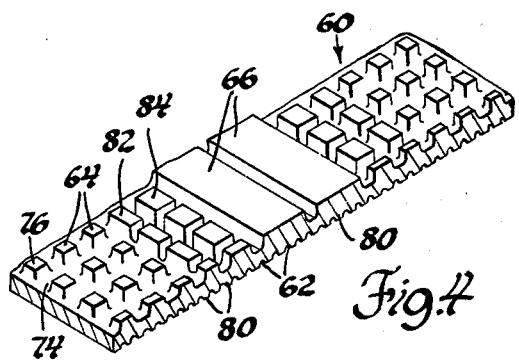
FIG. 4 is a perspective view of a segment of a compressible pad used in the method of the present invention.

A fragment of the pad 60 is illustrated in FIG. 4. The pad 60 is made of carbon steel with a low yield strength as compared with nickel base alloys of the casting 12 and the porous laminate sheath 22 as well as the material of the contoured pressure blocks 68, 70, 72.

The outer surface 74 of the pad 60 is photoetched to have the plurality of spaced lands 64 thereon. Each of the lands has a square head surface 76 with 0.020 inch sides. The lands are preferably located on 0.068 inch centers and have a depth of 0.020 inches. Such a land configuration accommodates approximately 0.005 inches of mismatch in the surfaces of the pressure blocks and the work piece represented by the combined casting 12 and sheath 22. Additionally, the pad grooves 62 formed in the opposite surface 78 thereof are each separated by a rib 80. Each of the grooves extend transversely across the pad and is approximately 0.010 inches in depth and is spaced on 0.022 inch centers from adjacent grooves. The compressible pad 60 is also preformed to have a first row of lands 82 on each side of the ribs and a second row of lands 84. Lands 82 have a cross sectional area at the contact surface thereof greater than the lands 64, 84 and the area of lands 84 is greater than that of lands 64.

The preformed pad 60 described above and located as discussed, upon the application of a load to the blocks 68, 70 produces about a 0.007 inch upset of the pad thickness. The pad has an original total thickness of 0.050 inch. It is understood that the area and location of the lands 64, 66, 82 and 84 may be varied to suit the component of die (tool) movement normal to the workpiece.

Figure 5:
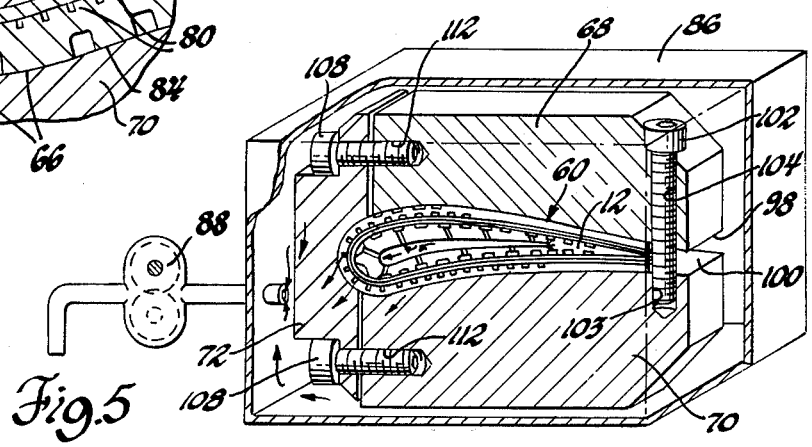
FIG. 5 is a fragmentary view of an outgas circuit used in the method of the present invention in part formed by transverse grooves of the pad in FIG. 4.

The ribs and grooves on the inner surface of the pad do not deform the porous laminate sheath 22 and furthermore, as seen in FIG. 5, the grooves 62 are formed completely along the longitudinal interface between it and the composite structure represented by the casting 14 and the sheath 22 so as to permit outgasing of the interstices represented by the passages 16, 24 and the like into an evacuated enclosure 86 which is in communication with the inlet side of a vacuum pump 88 for maintaining the piece under vacuum during the high temperature bonding cycle. The preformed pad when formed and located in accordance with the present invention will maintain the grooves open for outgas flow throughout the evacuation of enclosure 86.

In the diagrammatically illustrated outgas circuit of FIG. 5, the improved three piece pressure block fixture of the present invention is illustrated in relation to the compressible pad 60. The FIG. 5 representation omits the means for applying compression load to the block components of the improved fixture.

In accordance with other principles of the present invention it has been found that a more uniform pressure application around the leading edge of the composite assembly 10 is obtained by making use of a three piece block assembly wherein the blocks 68, 70 constitute a lateral vise for directing load against the inner and outer surfaces of the composite structure downstream of the leading edge thereof. The provision of a third block piece 72 located over the reinforced ribs 66 produces a load against the leading edge of the composite assembly 10 in a second direction of load application transverse to that applied by the vise-like fixture blocks 68, 70. The opposed direction of load application is preferably produced by placing the three pieces 68, 70 and 72 of the pressure block fixture in a generally rectangularly configured opening 90 formed in a differential expansion type ring 92 that produces a controlled expansion with respect to the blocks 68, 72, 70 when in place in the rectangular opening 90. A resultant thermally responsive application of load occurs in the direction represented by the arrows 94, produced by the vise action of the blocks 68, 70 and the transverse direction indicated by the arrows 96 in FIG. 7. Reference to a differential expansion system for applying a bonding load is more particularly set forth in U.S. Pat. No. 3,762,032 issued Oct. 2, 1973 to Bowling and Meginnis. In the present arrangement the outer ring 92 is formed of a molybdenum base alloy having a coefficient of expansion in the order of $2.7 \times 10^{-6}$ inch per inch per ° F. and the contoured blocks 68, 70 and 72 are fabricated from Hastelloy X having a coefficient of expansion of $9.0 \times 10^{-6}$ inch per inch per ° F. With blocks and rings configured as illustrated in FIG. 7 a differential expansion with respect to assembly 10 and pad 60 is produced at the 2000° F bonding temperature in the order of 0.0122 inches per 1 inch of fixture length. In one preferred embodiment the rectangular hole 90 was nominally dimensioned at 2.5 inches × 3.5 inches. At the bonding temperature of 2000° F the pressure surface 98 and the suction surface 100 of the side blocks 68 and 70 are subjected to an inward movement totaling 0.0305 inches and the leading edge block 72 is moved inwardly 0.0421 inches. This thermally produced differential motion is thus available to apply load upon the workpiece through the pad 60 so long as the creep strengths of the materials in the fixture are adequate. The total load applied to the laminated sheet 22 is limited by the upset deformation of the land portions 64 of the pad 60. In the illustrated arrangement the pad 60 is designed to yield at pressures in the order of 1000 p.s.i. The control clearance 106 is selected so that the tool assembly represented by the side blocks 68, 70 will never bottom out. This assures transfer of load to the bond interface formed between the laminated sheet 22 and the internal casting 12. Screws 108 in block 72 and screw 102 in block 68 are threaded into tapped holes 110, 112 and 103 in blocks 68, 70, respectively, to locate the blocks 68, 70 and 72 with respect to each other and to the workpiece until a substantial bonding load is applied. Handling pins 114, 116 on blocks 68, 70 accommodate a retaining ring which maintains overall tool dimensions for assembly of the unit into the circular ring.

The material of the ring 92 has excellent tensile properties even at the relatively high bonding temperatures and because of its large cross section is has excellent dimensional stability when it is loaded against the relatively low strength pressure pad 60. It should be noted that the cold clearances between the assembled pressure blocks 68, 70, 72 and also the cold clearance between the assembled blocks and rectangular opening 90 are adjusted to permit their sliding assembly and to define, without restriction at the highest temperature, the travel of the contoured blocks necessary to upset the pressure pad during the practice of the improved method.

The tool represented by the three piece fixture and ring 92 is self actuating when subjected to the bond temperature. The actuation can be effected in a simple vacuum furnace as represented by the enclosure 86 in FIG. 5. The arrangement enables improved outgassing of the workpiece as described above and is adaptable to high production rates as required. A further feature of the present invention is that it enables a continuous application of pressure to be produced on the workpiece which will gradually increase in accordance with gradual increases in temperature as diffusion bonding takes place.

While the embodiments of the present invention, as herein disclosed, constitute a preferred form, it is to be understood that other forms might be adopted.

We claim:

1. A method for bonding a laminated structure to a cast airfoil strut comprising: preforming a cast airfoil strut to have a leading edge, a trailing edge and first and second walls joining the leading edge to the trailing edge and the walls having cooling passages therethrough, preforming a laminated metallic sheath having an exterior surface and an inner surface each with a plurality of pin hole openings formed therein for communicating the wall cooling passages in the cast airfoil strut with the exterior surface of the sheath, wrapping said sheath by locating its inner surface over the first and second walls of said cast airfoil strut from the leading edge to the trailing edge and tack welding a portion thereon to the leading edge of said cast airfoil strut, preforming one side of a compressible pressure pad with a plurality of ribs and grooves each formed on the one side to extend completely across one length of the pad, preforming the opposite side of the compressible pressure pad to have a plurality of spaced apart separate lands, wrapping the pressure pad on the outer surface of the laminated metallic sheath to locate the plurality of ribs and grooves in contact across the full planar extent of the exterior surface of the laminated sheath including the full height thereof, thereafter placing the wrapped compressible pressure pad, laminated sheath and cast airfoil strut between the contoured pressure blocks and applying a predetermined load to deform the separate lands and to press the plurality of ribs thereon against the exterior surface of the laminated sheath for distributing load to the laminated sheath without deformation thereof, applying a vacuum to the pressure loaded pieces and maintaining a bonding temperature thereon, directing outgas flow from between the cast airfoil strut and laminated sheath outwardly along the grooves formed in the one side of the compressible pad along the full height of the cast airfoil strut during the bonding operation, the inner surface of the laminated sheath being bonded to the outer surface of the cast airfoil strut by the pressure directed thereagainst across the grooved surface of the pressure pad without interruption of the gas flow through the grooves.

2. A process for diffusion bonding a thin metallic porous laminated sheath to an airfoil casting having a leading edge, a trailing edge and first and second surfaces joining the leading and trailing edges, by means of a plurality of contoured pressure blocks having a cavity therein comprising the steps of; wrapping the metallic porous laminated sheath on the outer surface of the casting completely across the first and second surfaces from the leading to trailing edge, tacking a predetermined segment of the metallic sheath to the casting, preforming a compression pad with an inner and outer surface to have a plurality of transverse ribs and grooves formed longitudinally and completely across an inner surface portion thereof and to further have a separate plurality of compressible lands on the outer surface thereof, positioning the ribs and grooves on the inner surface in overlaying juxtaposed relationships with the outer surface of the wrapped metallic laminated porous sheath to provide communication between the grooves and pores in the metallic porous laminated sheath for outgasing of air trapped between the casting and sheath, supporting the compressible lands on the outer surface of the compression pad along the contour of the pressure blocks and applying pressure from the blocks thereagainst to produce deformation of the lands on the compressible pad, and a transfer of loading through the ribs of the pad against the outer surface of the metallic porous sheath to maintain the metallic sheath in intimate contact with the outer surface of the casting for a predetermined bond period, maintaining the pressure block cavity under vacuum to draw air from between the sheath and the pad along the full longitudinal interface therebetween, concurrently maintaining an elevated temperature during maintenance of the vacuum to produce a bonded interface between the inner surface of the laminated sheath and the casting without deformation of the laminated sheath.

3. A method for thermally bonding a metallic sheath on the outer surface of a casting of the type having a plurality of ribs formed thereon with transverse openings in communication with a plurality of valleys between each of the grooves and wherein the metallic sheath includes inner and outer surfaces with a plurality of pin point openings therein to communicate the valleys with the exterior surface of the metallic sheath comprising: the steps of wrapping the metallic sheath on the outer surface of the casting to maintain the inner surface thereof in intimate contact with each of the ribbed outer surface portions of the casting, preforming a pressure relief and compression pad with an inner and outer surface and of a softer material than that of the sheath and including a plurality of outgas grooves and ribs on the inner surface thereof with each rib and groove extending completely across the longitudinal extent of the pad, also preforming the pad to have a plurality of reinforcing ribs, and a plurality of spaced lands on the outer surface, locating the grooves in the inner surface of the pad to produce a predetermined spacing therebetween to locate an outgas groove in communication will all the pin point openings of the sheath when the pad is in place thereon, placing the wrapped pad, sheath and casting within spaced-apart pressure blocks with a cavity therebetween with the spaced lands on the outer surface of the pad being located in alignment with an inner surface of the pressure blocks, applying a predetermined load to the blocks sufficient to produce a controlled deformation of each of the spaced lands on the outer surface of the compression pad while distributing a bonding pressure through the ribs on inner surface of the compression pad across the full outer planar extent of the metallic sheath, maintaining a vacuum on the cavity between the pressure blocks to draw gas from the pad and sheath along the full longitudinal interface therebetween through the grooves and concurrently maintaining the compressed parts under an elevated temperature to produce a diffusion bond between the outer ribs surface of the casting and the inner surface of the metallic sheath.

* * * * *